Oct. 30, 1923.

A. E. HENDERSON 1,472,756

METHOD OF MANUFACTURING INNER TUBES FOR VEHICLE TIRES

Filed June 5, 1919     4 Sheets-Sheet 1

Inventor

Albert Ennis Henderson

Oct. 30, 1923.
A. E. HENDERSON
1,472,756
METHOD OF MANUFACTURING INNER TUBES FOR VEHICLE TIRES
Filed June 5, 1919    4 Sheets-Sheet 2
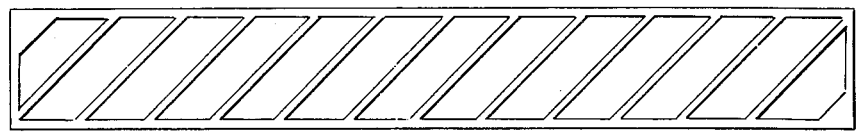
Fig 6
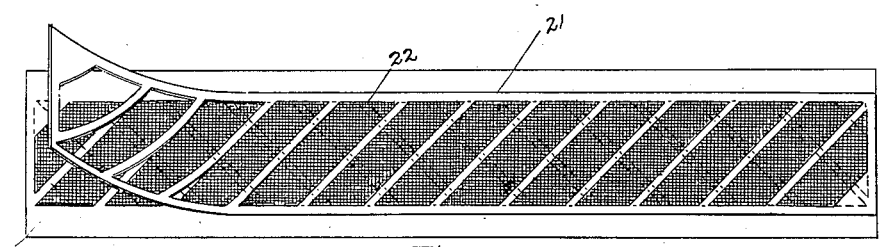
Fig 7
Fig 8
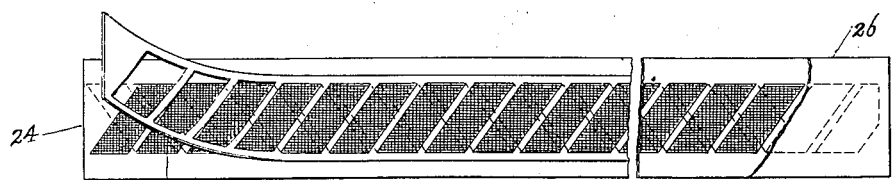
Fig 9
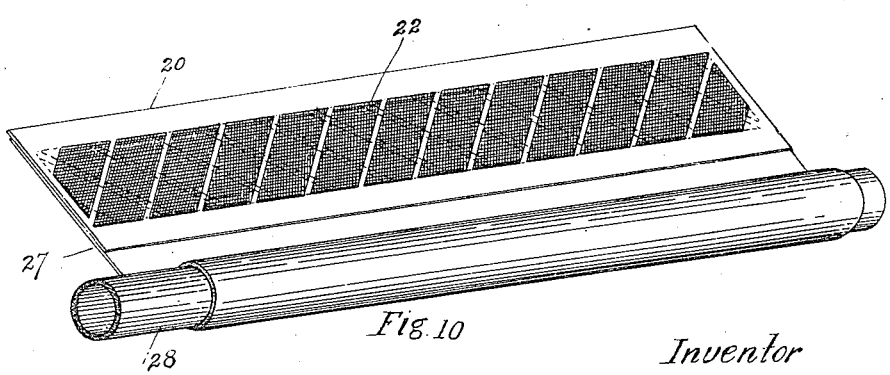
Fig 10
Inventor
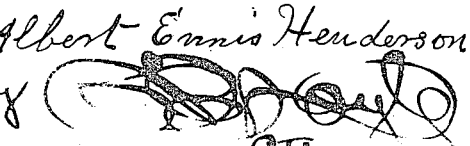
Albert Ennis Henderson Oct. 30, 1923.
1,472,756
A. E. HENDERSON
METHOD OF MANUFACTURING INNER TUBES FOR VEHICLE TIRES
Filed June 5, 1919
4 Sheets-Sheet 3
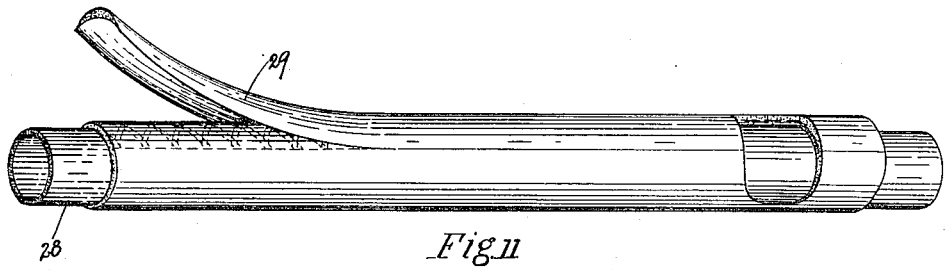
Fig.11
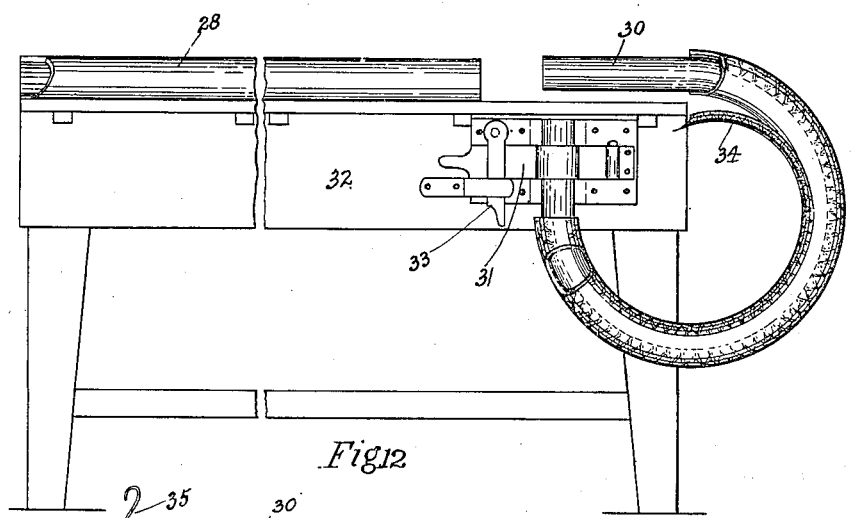
Fig.12
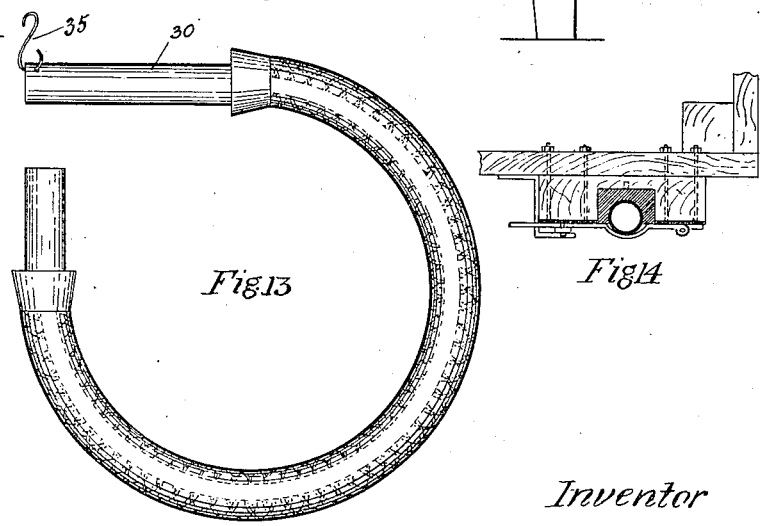
Fig.13
Fig.14
Inventor
Albert Ennis Henderson
By
Attorney Oct. 30, 1923.  
A. E. HENDERSON  
METHOD OF MANUFACTURING INNER TUBES FOR VEHICLE TIRES  
Filed June 5, 1919

Patented Oct. 30, 1923.

1,472,756

UNITED STATES PATENT OFFICE.

ALBERT ENNIS HENDERSON, OF TORONTO, ONTARIO, CANADA.

METHOD OF MANUFACTURING INNER TUBES FOR VEHICLE TIRES.

Application filed June 5, 1919. Serial No. 301,914.

*To all whom it may concern:*

Be it known that I, ALBERT ENNIS HENDERSON, a subject of the King of Great Britain, residing at Toronto, in the Province of Ontario and Dominion of Canada, have invented certain new and useful Improvements in Methods of Manufacturing Inner Tubes for Vehicle Tires, of which the following is a specification.

The object of the invention is to provide a method of manufacturing inner tubes for vehicle tires, particularly of the rolled sheet type, wherein a substantially uniform thickness of rubber in the resulting tube may be provided in connection with reinforcing tread and rim-side members applied as inserts, under conditions which insure a homogeneous incorporation of the several elements in a compact unitary structure, providing for the practical and efficient seating with facility of the inflation tube or valve from without the tire tube, and also providing for a puncture and leakage proof condition of the manufactured article.

Further objects and advantages of the invention will appear in the course of the following detailed description of a preferred embodiment of the invention, it being understood that changes in form and proportion of the product and minor variations of the procedure may be resorted to within the scope of the appended claims, without departing from the principles involved.

In the drawings:

Fig. 6 is a view of a templet used in the contruction of the tube, and more especially in relation to the tread side reinforcement.

Fig. 7 is a view illustrating the formation of the tread side reinforcing strip.

Fig. 8 is a view showing a modified or rim-side templet.

Fig. 9 is a view illustrating the formation of the rim-side reinforcing strip.

Fig. 10 is a view illustrating the rolling of the sheet and constituting an intermediate step in the method of forming the tube.

Fig. 11 is a view of the rolled sheet as it appears on the mandrel, showing application of the tread thickening element thereto.

Fig. 12 is a view of the tube in coiled position, associated with apparatus for that purpose, and showing the manner of applying the rim-side reinforcing unit.

Fig. 13 shows the coiled and otherwise completed tube as arranged for vulcanizing preparatory to reversal and joinder of the terminals.

Fig. 14. is a detailed sectional view of apparatus employed in transferring the rolled tube from the mandrel to the coiling tube.

Figure 15:
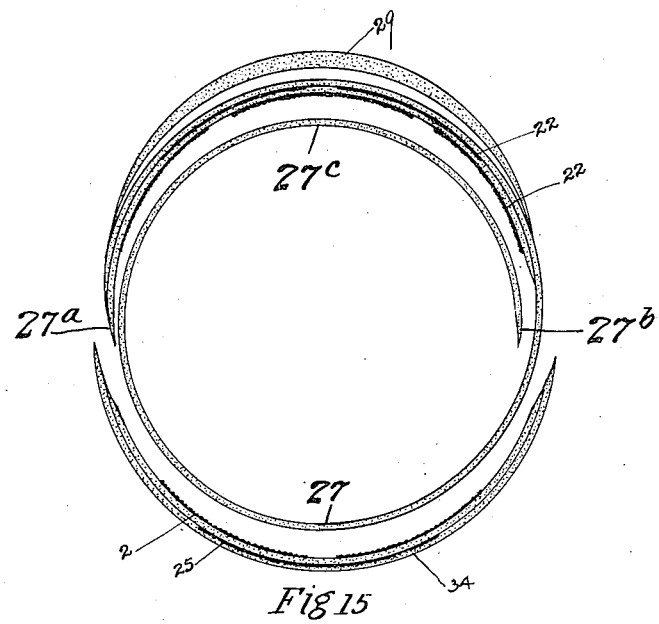

Fig. 15 is a sectional view of a loosely rolled tube to show graphically the relation of the convolutions thereof with the applied tread and rim-side reinforcements, before reversal.

Figure 16:
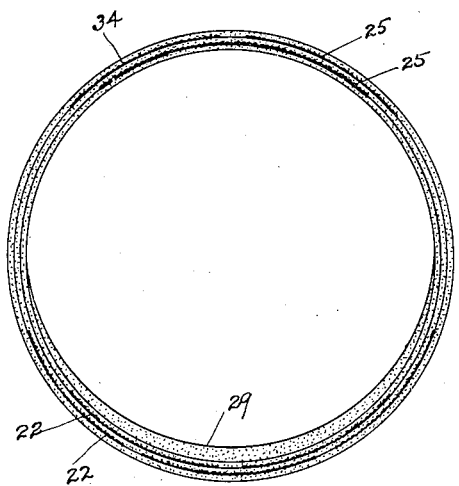

Fig. 16 is a similar view of the same, with the tube reversed.

Figure 1:
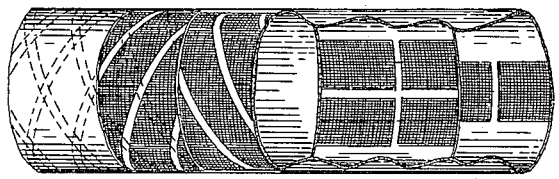
Fig. 1 is a plan view of a portion of a tube constructed in accordance with the invention.
Figure 2:
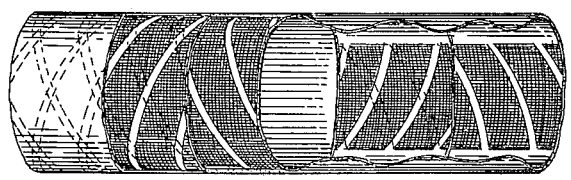
Fig. 2 is a similar view showing a slight modification in the arrangement of the reinforcing elements used in the rim-side portion of the tube.

In the formation of the inner tube forming the product of the invention, there is employed what may, for convenience, be termed a tread-side mandrel shown in Figure 6, which is adapted to be positioned first upon one side and then upon the other side of a strip 20, of rubber or like flexible and preferably elastic material to form the base of a tread-side reinforcing member, said templet having a plurality of openings forming guides or seats for positioning upon the flexible base or strip suitable reinforcing elements 21 of fabric such as a canvas or the like, and these openings or seats in the mandrel 22, which is shown upturned at one end of Fig. 7 of the drawing, may be either diagonally disposed as shown in said figure, or in parallelism therewith as indicated in Fig. 1 of the drawing. When the diagonal or oblique arrangement of the reinforcing elements is employed as shown in Figure 7, they are arranged on the reverse side of the flexible base or strip in intersecting relations as shown by the full and dotted lines in that figure, and while longitudinally there is a certain degree of elasticity or stretch to the strip by reason of the elastic properties of the base and the arrangement of the fabric elements as described with the interposed rubber strip, whether the arrangement of the fabric is diagonal or parallel this longitudinal elasticity or stretch is limited, so as to adapt the tread side strip to exert a limiting influence upon the longitudinal expansion of the completed tube, for reasons which will be apparent as the disclosure of the invention progresses.

In Figs. 8 and 9 a mandrel 23, modified as to dimensions, and the rim-side reinforcing strip having a base 24 also of rubber or other flexible and preferably elastic material and overlapping fabric elements 25 spaced by an interposed element of the base may be seen, but in this instance the base of the reinforcing member, for reasons which will appear later, consists of a plurality of elastic elements of which one as shown at 26 overlies one series of the fabric elements. In the formation of this reinforcing strip, which is employed on the rim-side of the completed tube, and which is of limited longitudinal elasticity or stretch, as described in reference to the tread-side strip, the fabric elements are first positioned by means of the templet upon either side of the base element 24, after which the second base element 26, is applied to the exposed surfaces of one of the layers of fabric elements as indicated in Fig. 9, which shows the parts broken away progressively with one end of the templet upturned as in Fig. 7, and wherein the opposite overlapping and intersecting fabric elements are shown respectively in full and dotted lines.

In the further formation of the tube, the tread side reinforcing strip is positioned upon the rubber sheet 27 at an intermediate point thereof and longitudinally of the same, in parallelism therewith, as indicated in Figure 10, and beginning with that side edge 27ᵇ (Fig. 15) of the sheet which is remote from the reinforcing strip, the latter being disposed at unequal distance from the opposite side edges 27ᵃ and 27ᵇ of the sheet, the latter is rolled upon a mandrel 28, and the width of the sheet, the diameter of the mandrel, the width of the strip and its position upon the sheet are so proportioned that when the mandrel has been turned one or more times, to apply one or more thicknesses or convolutions of the rubber sheet thereupon, the number to be determined by the desired thickness, of the proposed tube, the opposite side edges 27ᵃ and 27ᵇ of the sheet will be disposed at equal distances from the opposite side edges of the tread reinforcing strip measured transversely of the tube, and said side edges of the sheet will be spaced apart to form an interval 27ᶜ in which the wall of the tube consists, as so far constructed, of a less number of thicknesses of the rubber sheet within the remaining portion of the wall of the tube, this interval preferably corresponding in width with that of the rim-side reinforcing strip, which is preferably narrower than the tread side strip and is of less length than the same, so that whereas in the completed tube the tread side strip shall correspond with the length of the longitudinal circumference of the tube when inflated, the rim-side strip shall correspond with the length of the longitudinal circumference of the tube, measured respectively at the tread-side and rim-side of the tube.

Having completed the tube to the point above indicated, namely, to the extent of rolling the sheet completely upon the mandrel so as to enclose the tread-side reinforcing strip as shown in Figure 11, the next step in the procedure is to apply to the exterior of the tube on the tread-side a thickened rubber tread-element, 29, as indicated in said figure, provided, of course, it is desired that the ultimate tube shall have a thickened tread, and bearing in mind that the application of this tread-thickening element when applied as indicated to the exterior surface of the primarily rolled tube will cause it to occupy a position within or at the inner surface of the tread-side of the tube when the latter is reversed or turned inside out as a further step in the method of manufacture as hereinafter more fully explained. While the employment of this tread-thickening element is not an indispensable feature of a tire tube constructed in accordance with the invention, as in other respects the method may be pursued to an ultimately satisfactory product by simply omitting this feature, the advantage of its use resides in the fact that owing to the relatively inelastic or nonstretchable character of the tread reinforcing element, considered transversely as well as longitudinally of the tire tube, the effect of the reversal and inflation of the tube is to place this rubber-tread element in compression, to afford a self-healing feature to guard against leakage of air in case of puncture.

After the rolling of the rubber sheet upon the mandrel followed by the application of the thickened tread portion 29, if the latter is to be used, the transfer of the tube from said mandrel to a coiling tube or form 30 is effected, as indicated in Fig. 12 of the drawing, said coiling element being supported in the proper position for this transfer by a clamp 31 supported by a suitable bench 32 and held in place by a latch 33. Having effected the coiling of the tube with the tread reinforcement disposed at the outer side of the longitudinal circumference of the product the inner or rim-side reinforcing strip or element is applied to the inner circumferential surface of the tube as indicated also in Fig. 12 where said element is designated by the numeral 34, and the tube is then ready for vulcanization for which purpose it may be supported by means of the suspension hook 35.

Figure 3:
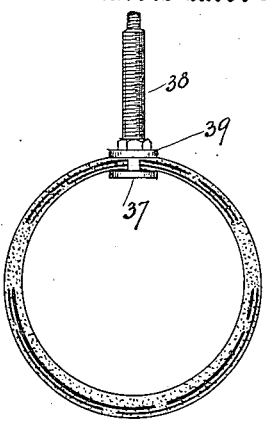
Fig. 3 is a cross-sectional view of a completed tube showing an inflation valve in its operative relation thereto.
Figure 5:
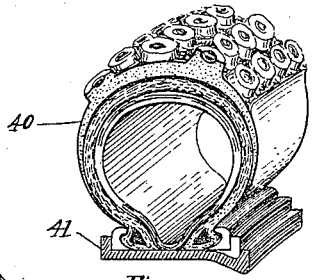
Fig. 5 is a sectional view of the tube encased in a shoe and seated upon a rim of the clincher type.
Figure 4:
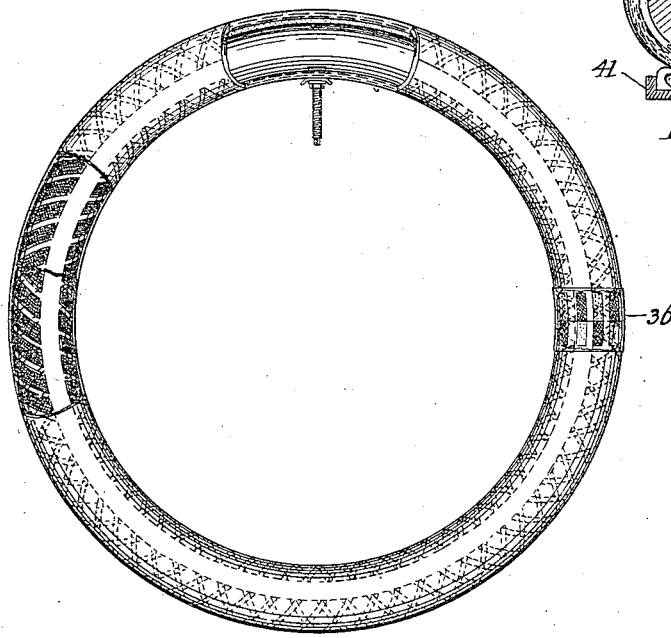
Fig. 4 is a side view of a tube partly broken away and indicating the joint between the previously separate ends of the rolled, coiled and reversed tube.

Subsequent to vulcanization the tube should be reversed or turned inside out so that the elements occupy the relative positions indicated in Fig. 4 whereupon the ends of the tube may be joined and secured together as shown at 36. Fig. 3 of the drawing shows the completed tube in cross section with the inflation valve applied and secured in the ordinary way, the insertion thereof being from the exterior of the tube through an opening formed in the rubber at the intersection of intervals between the edges of the fabric reinforcing elements at the rim-side of the tube, so that whereas the sides of the opening thus formed will separate sufficiently by reason of the elasticity of the rubber to permit the introduction of the button 37 at the inner end of the inflation tube at 38, the sides of the opening will immediately contract to dispose the edges of the rubber layers and the associated fabric elements between said button and the adjustable collar 39 and in close contact with the stem of the inflation valve. In Fig. 5 the structure as described is shown disposed in a tire casing or shoe 40 and seated in the usual way upon a wheel rim 41.

Thus there is secured a substantially uniform thickness of wall at the tread and rim sides of the tube notwithstanding the fact that in the construction of the reinforcing elements the applied rim-side feature embodies an elastic base element which is of greater thickness or contains a greater number of layers than the tread-side feature, and notwithstanding the fact that in order to obtain the desired compression at the tread-side of the tube there has been employed an additional tread thickening element, the width of the rim-side of the reinforcement being such as to extend beyond the zone of the wheel rim to protect the tube against pinching in the event of partial deflation.

I claim:

1. The method of forming reinforced plural ply rolled rubber tubes which consists in rolling a sheet of rubber into tubular form and applying to the ultimately interior surface thereof a strip bearing reinforcing fabric elements, the opposite side edges of the rolled sheets being spaced apart circumferentially of the rolled tube to provide an interval of reduced diametrical thickness for the reception of said strip.

2. The method of forming a reinforced plural ply rolled rubber tube of substantially uniform transverse thickness which consists in rolling a sheet of rubber into tubular form and applying to the ultimately interior surface thereof, a relatively inelastic reinforcing strip extending continuously of the rim-side surface of the ultimate tube, the opposite edges of the rolled sheet being spaced apart circumferentially of the rolled tube to provide an interval of reduced diametrical thickness for the reception of said strip.

3. The method of forming a reinforced plural ply rolled rubber tube which consists in rolling a sheet of rubber into tubular form, coiling the tube, applying to the ultimately interior surface of the inner circumferential area a reinforcing strip, the opposite side edges of the rolled sheet being spaced apart transversely of the rolled tube to provide an interval of reduced thickness for the reception of said strip, then vulcanizing, and finally reversing the tube and joining the extremities thereof.

4. The method of forming a reinforced plural ply rolled rubber tube which consists in applying longitudinally to an intermediate portion of the width of a rubber sheet a reinforcing element, then rolling the sheet into tubular form, coiling the tube thus formed to dispose the reinforcing element at the outer longitudinal circumference, applying to the ultimately interior surface of the inner longitudinal circumference a reinforcing element of less length than the first named reinforcing element, vulcanizing and finally reversing and joining the extremities of the tube.

5. The method of forming reinforced plural ply rolled rubber tubes which consists in rolling a sheet into tubular form, coiling the tube, applying to the ultimately interior surface of the inner circumference thereof a reinforcing strip of a length determining the ultimate rim-side circumference of the tube, vulcanizing, and finally reversing and joining the extremities of the tube.

6. The method of forming reinforced plural ply rolled rubber tubes which consists in applying longitudinally to an intermediate portion of the width of a rubber sheet a relatively inelastic reinforcing strip, rolling the sheet into tubular form to incorporate said strip, coiling the tube with said strip at the outer circumference thereof, applying to the ultimately interior surface of the inner circumference a relatively inelastic reinforcing strip of a length determining the ultimate rim-side circumference of the tube, then vulcanizing and finally reversing and joining the extremities of the tube.

7. The method of forming a reinforced plural ply rolled rubber tube which consists in applying to a sheet of rubber a reinforcing strip of transverse relative inelasticity, rolling the sheet transversely of the length of said strip to form a tube, coiling the tube thus formed to arrange said reinforcing strip at the outer circumference thereof, applying to the ultimate interior surface of the inner circumference a rim-side reinforcing strip of substantial longitudinal inelasticity, vulcanizing, and finally reversing and joining the extremities of the tube.

8. The method of forming a reinforced plural ply rolled rubber tube, which consists in applying longitudinally to an intermediate portion of the width of a rubber sheet a reinforcing strip of a length determining the ultimate tread circumference of the tube and of relative transverse elasticity, rolling the sheet to incorporate said strip, applying to the exterior surface of the tube thus formed a thickened rubber tread, disposed within the area of said reinforcing strip, coiling the tube to dispose said reinforcing strip and thickened tread portion at the exterior circumference of the coil, applying to the interior circumference of the coil, a reinforcing rim-side strip of a length determining the ultimate rim-side circumference of the tube, vulcanizing and finally reversing and joining the extremities of the tube.

9. The method of forming a reinforced plural ply rolled rubber tube which consists in applying to a rubber sheet a reinforcing strip extending longitudinally of said sheet at an intermediate transverse point thereof, said strip consisting of a rubber base having parallel opposed series of overlapping fabric elements disposed to limit the longitudinal and transverse elasticity of said strip, rolling said sheet to dispose the reinforcing strip longitudinally thereof, coiling the tube thus formed to dispose the reinforcing strip at the outer circumference of the coil, applying to the outer circumference thereof a compressible tread-thickening element, applying to the inner circumference thereof a second reinforcing strip consisting of a rubber base carrying series of opposed overlapping fabric elements disposed to limit the longitudinal elasticity of the strip and serving to determine the ultimate rim-side circumference of the tube, vulcanizing and finally reversing and joining the extremities of the tube.

10. The method of forming reinforced plural ply rolled rubber tubes having tread and rim-side reinforcements which consists in applying to a rubber sheet a tread reinforcing strip of limited transverse and longitudinal elasticity and embodying one or more thicknesses of sheet rubber, rolling the sheet transversely of said strip to incorporate the same, the width of the sheet being such as to leave uncompleted the final or outside layer of rubber and thus provide a tube wall of a reduced number of thicknesses bounded by the said edges of the sheet, coiling the tube thus formed to arrange the thinner wall portion at the inner circumference of the coil, applying between said side edges of the rubber sheet a rim-side reinforcing strip embodying a greater number of thicknesses of rubber than said tread-side strip and of relatively inelastic construction to determine the ultimate rim-side circumference of the tube, then vulcanizing and finally reversing and joining the extremities of the tube.

11. The method of making tire tubes comprising forming a tube of rubber, and providing it with overlapping radially separated, oppositely located longitudinal reenforcements at the tread-side and rim-side, vulcanizing it and joining its ends, substantially as set forth.

12. The method of making tire tubes comprising forming a tube of rubber, and providing it with relatively inextensible oppositely located longitudinal reenforcements at the ultimate tread-side and rim-side, applying a relatively thick longitudinal layer of rubber at the ultimately interior side opposite the tread, vulcanizing the tube, reversing it and joining its ends, substantially as set forth.

13. The method of manufacturing reenforced rubber fabrics comprising applying to one side of a strip of rubber a templet having diagonal slots, arranging strips of fabric in the slots, applying to the opposite side of the rubber strip, a templet having diagonal slots in crossing relation to said strips, arranging strips of fabric in said slots, and causing both sets of fabric strips to adhere to the rubber strip, substantially as set forth.

14. The method of manufacturing fabric reenforced rubber tires comprising applying to a strip of rubber, a templet having diagonal slots, positioning a series of fabric strips in said slots and causing them to adhere to said rubber strip, similarly locating the fabric strips of a second series to lie transversely of those of the first series in the completed tire, applying the rubber strip and attached fabric elements to a rubber sheet and rolling the sheet into a tube, substantially as set forth.

ALBERT ENNIS HENDERSON.